United States Patent
Derbanne et al.

(10) Patent No.: US 12,211,520 B2
(45) Date of Patent: *Jan. 28, 2025

(54) SYSTEMS AND METHODS FOR GENERATING TIME-LAPSE VIDEOS

(71) Applicant: GoPro, Inc., San Mateo, CA (US)

(72) Inventors: Thomas Derbanne, Paris (FR); Cesar Douady, Orsay (FR); Maxim Karpushin, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,637

(22) Filed: Aug. 3, 2023

(65) Prior Publication Data

US 2023/0377605 A1    Nov. 23, 2023

Related U.S. Application Data

(63) Continuation of application No. 17/575,284, filed on Jan. 13, 2022, now Pat. No. 11,735,225, which is a
(Continued)

(51) Int. Cl.
*G11B 27/00* (2006.01)
*G11B 27/13* (2006.01)
(Continued)

(52) U.S. Cl.
CPC ............ *G11B 27/005* (2013.01); *G11B 27/13* (2013.01); *G11B 27/34* (2013.01); *H04N 23/6812* (2023.01); *H04N 23/683* (2023.01)

(58) Field of Classification Search
None
See application file for complete search history.

(56) References Cited

U.S. PATENT DOCUMENTS 10,593,363 B2    3/2020    Derbanne
10,916,272 B2    2/2021    Derbanne
(Continued)

OTHER PUBLICATIONS

Extended European Search Report for App. No. EP19802924.1, dated Nov. 24, 2021, 7 pages.
(Continued)

*Primary Examiner* — Heather R Jones
(74) *Attorney, Agent, or Firm* — ESPLIN & ASSOCIATES, PC

(57) ABSTRACT

Video content may be captured by an image capture device during a capture duration. The video content may include video frames that define visual content viewable as a function of progress through a progress length of the video content. Rotational position information may characterize rotational positions of the image capture device during the capture duration. Time-lapse video frames may be determined from the video frames of the video content based on a spatiotemporal metric. The spatiotemporal metric may characterize spatial smoothness and temporal regularity of the time-lapse video frames. The spatial smoothness may be determined based on the rotational positions of the image capture device corresponding to the time-lapse video frames, and the temporal regularity may be determined based on moments corresponding to the time-lapse video frames. Time-lapse video content may be generated based on the time-lapse video frames.

20 Claims, 7 Drawing Sheets

Related U.S. Application Data continuation of application No. 17/118,296, filed on Dec. 10, 2020, now Pat. No. 11,257,521, which is a continuation of application No. 16/786,947, filed on Feb. 10, 2020, now Pat. No. 10,916,272, which is a continuation of application No. 15/978,813, filed on May 14, 2018, now Pat. No. 10,593,363.

(51) Int. Cl.
*G11B 27/34* (2006.01)
*H04N 23/68* (2023.01)

(56) References Cited

U.S. PATENT DOCUMENTS

| | | | |
|---|---|---|---|
| 11,257,521 B2 | 2/2022 | Derbanne | |
| 11,735,225 B2 | 8/2023 | Derbanne | |
| 2003/0185450 A1 | 10/2003 | Garakani | |
| 2014/0105564 A1 | 4/2014 | Johar | |
| 2015/0248916 A1* | 9/2015 | Kopf | G06T 7/557 |
| | | | 386/278 |
| 2016/0004390 A1 | 1/2016 | Laska | |
| 2017/0094195 A1 | 3/2017 | Adsumilli | |
| 2017/0180645 A1 | 6/2017 | Weckel | |
| 2017/0195568 A1* | 7/2017 | Leizerovich, Jr. | G03B 37/04 |
| 2017/0359549 A1 | 12/2017 | Baran | |
| 2019/0348075 A1 | 11/2019 | Derbanne | |
| 2020/0185005 A1 | 6/2020 | Derbanne | |
| 2021/0090607 A1 | 3/2021 | Derbanne | |
| 2022/0139425 A1 | 5/2022 | Derbanne | |

OTHER PUBLICATIONS

Grundmann, Matthias, Vivek Kwatra, and Irfan Essa. "Auto-directed video stabilization with robust L1 optimal camera paths." IEEE Conference on Computer Vision and Pattern Recognition (CVPR) . IEEE, 2011. pp. 225-232.

International Search Report and Written Opinion for Application No. PCT/US2019/031482, date of mailing Jul. 17, 2019, 9 pages.

Jia, Chao, and Brian L. Evans. "Constrained 3D Rotation Smoothing via Global Manifold Regression for Video Stabilization." IEEE Trans. Signal Processing 62.13 (2014): 3293-3304.

Joshi, Neel, et al. "Real-time hyperlapse creation via optimal frame selection." ACM Transactions on Graphics (TOG) 34.4 (2015): 63. 9 pages.

* cited by examiner

SYSTEMS AND METHODS FOR GENERATING TIME-LAPSE VIDEOS

FIELD

This disclosure relates to generating time-lapse videos based on spatial smoothness and temporal regularity of video frames.

BACKGROUND

A video may have been captured by an image capture device in motion. The motion of the image capture device during the capture of the video may cause the video to appear jerky/shaky.

SUMMARY

This disclosure relates to generating time-lapse videos. Video information defining video content, rotational position information of an image capture device, and/or other information may be obtained. The video content may be captured by the image capture device during a capture duration. The video content may have a progress length. The video content may include video frames that define visual content viewable as a function of progress through the progress length. The video frames may correspond to moments within the progress length. The rotational position information may characterize rotational positions of the image capture device during the capture duration based on output signals generated by a motion sensor. Time-lapse video frames may be determined from the video frames of the video content based on a spatiotemporal metric and/or other information. The spatiotemporal metric may characterize spatial smoothness and temporal regularity of the time-lapse video frames. The spatial smoothness may be determined based on the rotational positions of the image capture device corresponding to the time-lapse video frames. The temporal regularity may be determined based on moments corresponding to the time-lapse video frames. Time-lapse video content may be generated based on the time-lapse video frames. The time-lapse video content may include a fewer number of video frames than the video content.

A system that generates time-lapse videos may include one or more electronic storages, one or more processors, and/or other components. An electronic storage may store video information defining video content, rotational position information of an image capture device, and/or other information. Video content may refer to media content that may be consumed as one or more videos. Video content may include one or more videos stored in one or more formats/containers, and/or other video content. The video content may be captured by an image capture device during a capture duration. The video content may have a progress length. The video content may define visual content viewable as a function of progress through the progress length of the video content. Video content may include video frames that define visual content. That is, visual content of the video content may be included within video frames of the video content. The video frames may correspond to moments within the progress length.

The processor(s) may be configured by machine-readable instructions. Executing the machine-readable instructions may cause the processor(s) to facilitate generating time-lapse videos. The machine-readable instructions may include one or more computer program components. The computer program components may include one or more of a video information component, a rotational position information component, a video frames component, a video content component, and/or other computer program components.

The video information component may be configured to obtain video information defining one or more video content and/or other information. The video information component may obtain video information from one or more storage locations. The video information component may obtain video information during acquisition of the video content and/or after acquisition of the video content by one or more image sensors/image capture devices.

The rotational position information component may be configured to obtain rotational position information of an image capture device and/or other information. Rotational position information of an image capture device may characterize rotational positions of the image capture device that captured the video content during the capture duration. Rotational position information may be determined based on one or more output signals generated by one or more motion sensors (e.g., a motion sensor of the image capture device). For example, rotational position information may be conveyed by the output signals generated by the motion sensor. In some implementations, the motion sensor may include one or more of a gyroscope, an accelerometer, and/or an inertial measurement unit, and the rotational position information may be determined independent of the video information.

The video frames component may be configured to determine time-lapse video frames from the video frames of the video content based on a spatiotemporal metric and/or other information. The spatiotemporal metric may characterize spatial smoothness, temporal regularity, and/or other characteristics of the time-lapse video frames. The spatial smoothness may be determined based on the rotational positions of the image capture device corresponding to the time-lapse video frames and/or other information. The spatial smoothness may be determined further based on one or more transformations applied to the time-lapse video frames. Transformation(s) may be applied to a time-lapse video frame to make the time-lapse video frame appear as if it were captured from different (e.g., smoother) orientations. The temporal regularity may be determined based on moments corresponding to the time-lapse video frames and/or other information.

In some implementations, the spatiotemporal metric may include a spatial acceleration component, a temporal acceleration component, a spatial velocity component, a temporal velocity component, and/or other components. The spatial acceleration component may be determined based on angular acceleration of the image capture device during capture of the time-lapse video frames and/or other information, and the temporal acceleration component may be determined based on differences between the moments corresponding to the time-lapse video frames and/or other information. The spatial velocity component may be determined based on angular velocity of the image capture device during capture of the time-lapse video frames and/or other information, and the temporal velocity component may be determined based on a comparison of a speed pattern of the time-lapse video frames and a desired speed pattern for the time-lapse video content and/or other information.

In some implementations, the spatiotemporal metric may further include a content component. The content component may be determined based on the visual content of the time-lapse video frames and/or other information. The spatiotemporal metric may further characterize content characteristics of the time-lapse video frames. The speed pattern of the time-lapse video frames may be determined based on the content characteristics of the time-lapse video frames and/or other information. The speed pattern of the time-lapse video frames may include a speed-up for a sub-set of the time-lapse video frames based on the content characteristics of the sub-set of the time-lapse video frames indicating no highlight event within the sub-set of the time-lapse video frames.

In some implementations, the time-lapse video frames may be determined further based on a skipping bound and/or other information.

In some implementations, determining the time-lapse video frames may include: selecting a set of video frames of the video content based on the spatiotemporal metric and/or other information, and stabilizing at least some of the set of video frames.

The video content component may be configured to generate time-lapse video content based on the time-lapse video frames and/or other information. The time-lapse video content may include a fewer number of video frames than the video content. In some implementations, the time-lapse video content may be generated based on storage of a set of video frames in a frame selection buffer and a stabilization buffer.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
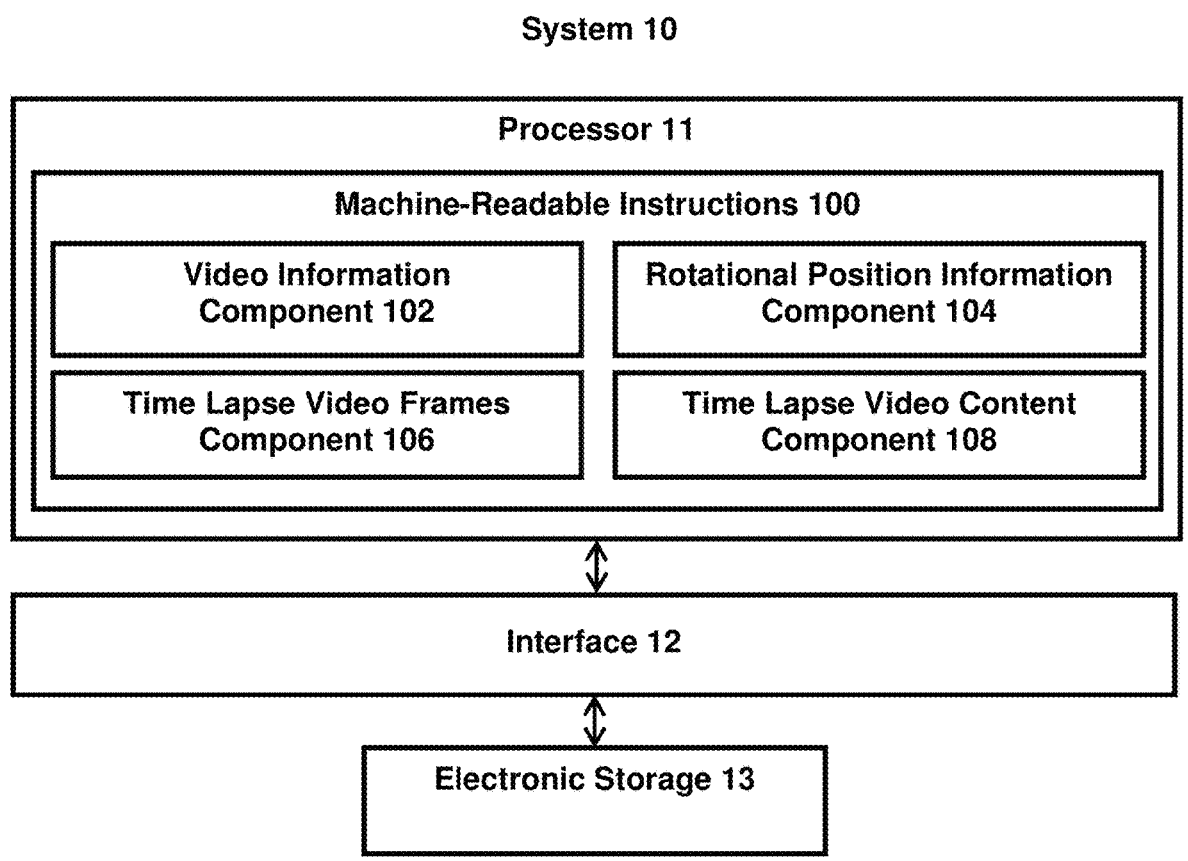
FIG. 1 illustrates a system that generates time-lapse videos.

FIG. 1 illustrates a system 10 for generating time-lapse videos. The system 10 may include one or more of a processor 11, an interface 12 (e.g., bus, wireless interface), an electronic storage 13, and/or other components. Video information defining video content, rotational position information of an image capture device, and/or other information may be obtained by the processor 11. The video content may be captured by the image capture device during a capture duration. The video content may have a progress length. The video content may include video frames that define visual content viewable as a function of progress through the progress length. The video frames may correspond to moments within the progress length. The rotational position information may characterize rotational positions of the image capture device during the capture duration based on output signals generated by a motion sensor.

Time-lapse video frames may be determined from the video frames of the video content based on a spatiotemporal metric and/or other information. The spatiotemporal metric may characterize spatial smoothness and temporal regularity of the time-lapse video frames. The spatial smoothness may be determined based on the rotational positions of the image capture device corresponding to the time-lapse video frames. The temporal regularity may be determined based on moments corresponding to the time-lapse video frames. Time-lapse video content may be generated based on the time-lapse video frames. The time-lapse video content may include a fewer number of video frames than the video content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video content, rotational position information, information relating to rotational positions of an image capture device, information relating to the image capture device, information relating to a motion sensor, information relating to time-lapse video frames, information relating to spatiotemporal metric, information relating to time-lapse video content, and/or other information.

Video content may refer to media content that may be consumed as one or more videos/video clips. Video content may include one or more videos/video clips stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format).

Video content may include a video clip captured by an image capture device (including one or more image sensors and one or more optical elements that guide light to the image sensor(s)), multiple video clips captured by an image capture device, and/or multiple video clips captured by different image capture devices. Video content may include multiple video clips captured at the same time and/or multiple video clips captured at different times. Video content may include a video clip processed by a video application, multiple video clips processed by a video application, and/or multiple video clips processed by different video applications.

Video content may have a progress length. A progress length may be defined in terms of time durations and/or number of video frames. For example, video content may include a video having a time duration of 60 seconds. Video content may include a video having 1800 video frames. Video content having 1800 video frames may have a play time duration of 60 seconds when viewed at 30 frames/ second. Other progress lengths, time durations, and numbers of video frames are contemplated.

Video content may define visual content viewable as a function of progress through the progress length of the video content. Video content may include video frames that define visual content. That is, visual content of the video content may be included within video frames of the video content. The video frames may correspond to different moments (points in time, durations of time) within the progress length. The video frames may include a given video frame corresponding to a given moment within the progress length.

In some implementations, video content may include one or more spherical video content, virtual reality content, and/or other video content. Spherical video content and/or virtual reality content may define visual content viewable from a point of view as a function of progress through the progress length of the spherical video/virtual reality content.

An image capture device that captures video content may be a standalone device (e.g., camera) or may be part of another device (e.g., part of a smartphone). The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11 and/or the electronic storage 13 of the system 10 may be carried by the housing of the image capture device. The housing may carry other components, such as image sensor(s), optical element(s), option sensor(s), and/or other components.

Figure 3:
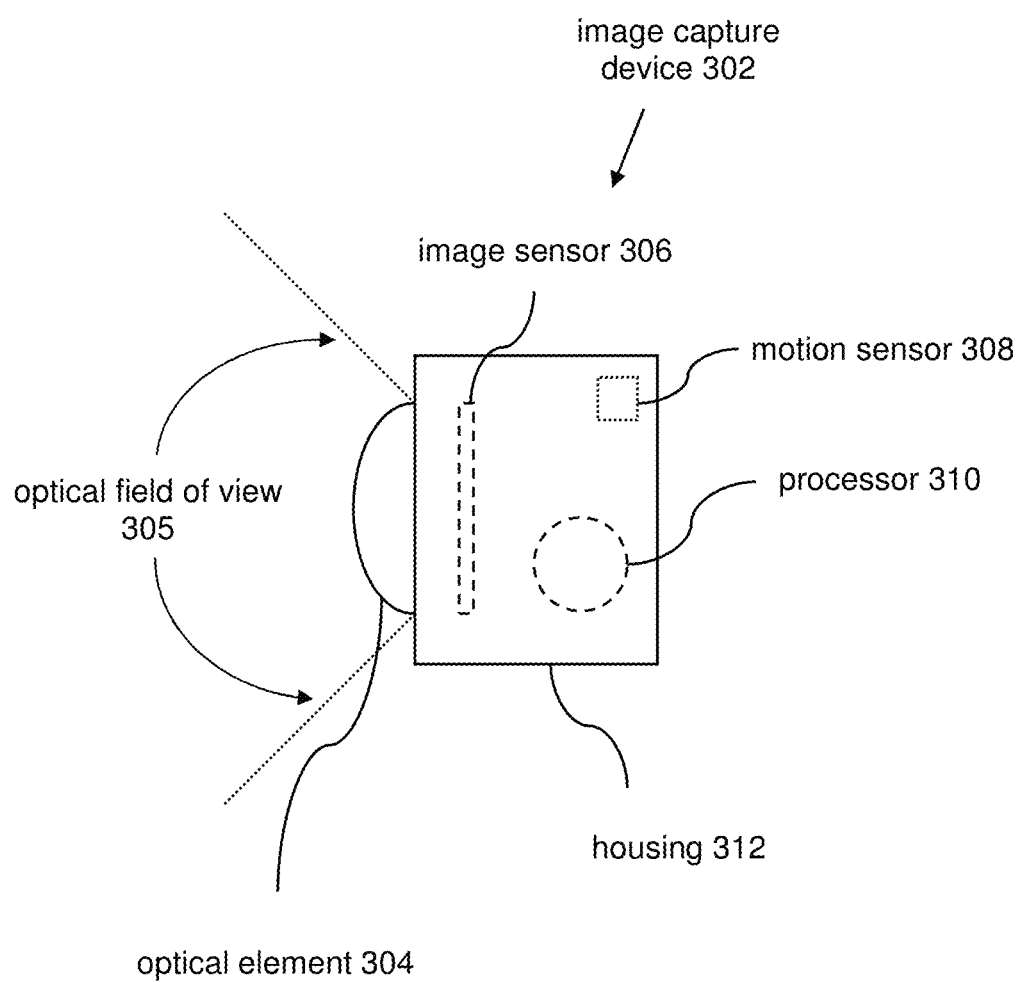
FIG. 3 illustrates an example image capture device.

For example, video content may be captured by an image capture device 302 shown in FIG. 3. The image capture device 302 may include a housing 312, and the housing 312 may carry (be attached to, support, hold, and/or otherwise carry) an optical element 304, an image sensor 306, a motion sensor 308, a processor 310, and/or other components. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may be configured to guide light within an optical field of view 305 to the image sensor 306. The optical field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines one or more images (e.g., standalone images, video frames of a video). For example, the image sensor 306 may be configured to generate an image output signal based on light that becomes incident thereon during a capture duration. The image output signal may convey image information that defines image(s) with the optical field of view 305. Image(s) generated from the image sensor 306 may be used to form video content. For example, image(s) generated from the image sensor 306 may be used as one or more video frames of the video content and/or used to generate one or more video frames of the video content.

The motion sensor 308 may include sensor(s) that converts experienced positions/motions into output signals. The output signals may include electrical signals. For example, the motion sensor 308 may include a set of motion sensors, which may include one or more inertial measurement units, one or more accelerometers, one or more gyroscopes, and/or other motion sensors. The motion sensor 308 may generate output signals conveying information that characterizes positions/changes in positions of the motion sensor 308 and/or device(s) carrying the motion sensor 308. For example, the motion sensor 308 may be configured to generate a motion output signal based on positions of the motion sensor 308/image capture device 302 during the capture duration.

The motion output signal may convey rotational position information that characterizes rotational positions/changes in rotational positions of the motion sensor 308/image capture device 302 at different points/durations within the capture duration. The rotational position information may characterize rotational positions/changes in rotational positions of the motion sensor 308/image capture device 302 based on specific rotational positions of the motion sensor 308/image capture device 302 and/or based on changes in rotational positions of the motion sensor 308/image capture device 302 as a function of progress through the capture duration. That is, the rotational position information may characterize rotational positions of the motion sensor 308/image capture device 302 and/or changes in rotational positions (motion) of the motion sensor 308/image capture device 302 (e.g., direction, amount, velocity, acceleration) during the capture duration.

In some implementations, the motion output signal may convey translational position information that characteristics translational positions/changes in translational positions of the motion sensor 308/image capture device 302 at different points/durations within the capture duration. The translational position information may characterize translational positions/changes in translational positions of the motion sensor 308/image capture device 302 based on specific translational positions of the motion sensor 308/image capture device 302 and/or based on changes in translational positions of the motion sensor 308/image capture device 302 as a function of progress through the capture duration. That is, the translational position information may characterize translational positions of the motion sensor 308/image capture device 302 and/or changes in translational positions (motion) of the motion sensor 308/image capture device 302 (e.g., direction, amount, velocity, acceleration) during the capture duration.

The rotational position information and/or the translational position information may be determined based on signals generated by the motion sensor 308 and independent of the information/signals generated by the image sensor 306. That is, rotational position information and/or translational position information may be determined without using images/videos generated by the image sensor 306. Use of images/videos to determine rotational/translational positions/motions of the image capture device 302 may be computationally expensive in terms of processing power, processing time, and/or battery consumption. Using the information/signals from the motion sensor 308 to determine rotational/translational positions/motions of the image capture device 302 may be computationally cheaper. That is, less processing power, processing time, and/or battery consumption may be required when rotational/translational positions/motions of the image capture device 302 are determined from the information/signals from the motion sensor 308 than the information/signals from the image sensor 306. Using the information/signals from the motion sensor 308 to determine rotational/translational positions/motions of the image capture device 302 may enable selection of time-lapse video frames during capture of the video content, rather than waiting until the video content is captured and performing image analysis to select the time-lapse video frames.

The rotational position information and/or the translational position information may be used to determine a trajectory of an image capture device during a capture duration. A trajectory of an image capture device may refer to one or more paths and/or progression followed by the image capture device during the capture duration. The observed trajectory may reflect positions of the image capture device at different moments within the capture duration. The positions of the image capture device may include rotational positions (e.g., rotations about one or more axis of the image capture device) and/or translational positions of the image capture device.

Figure 4:
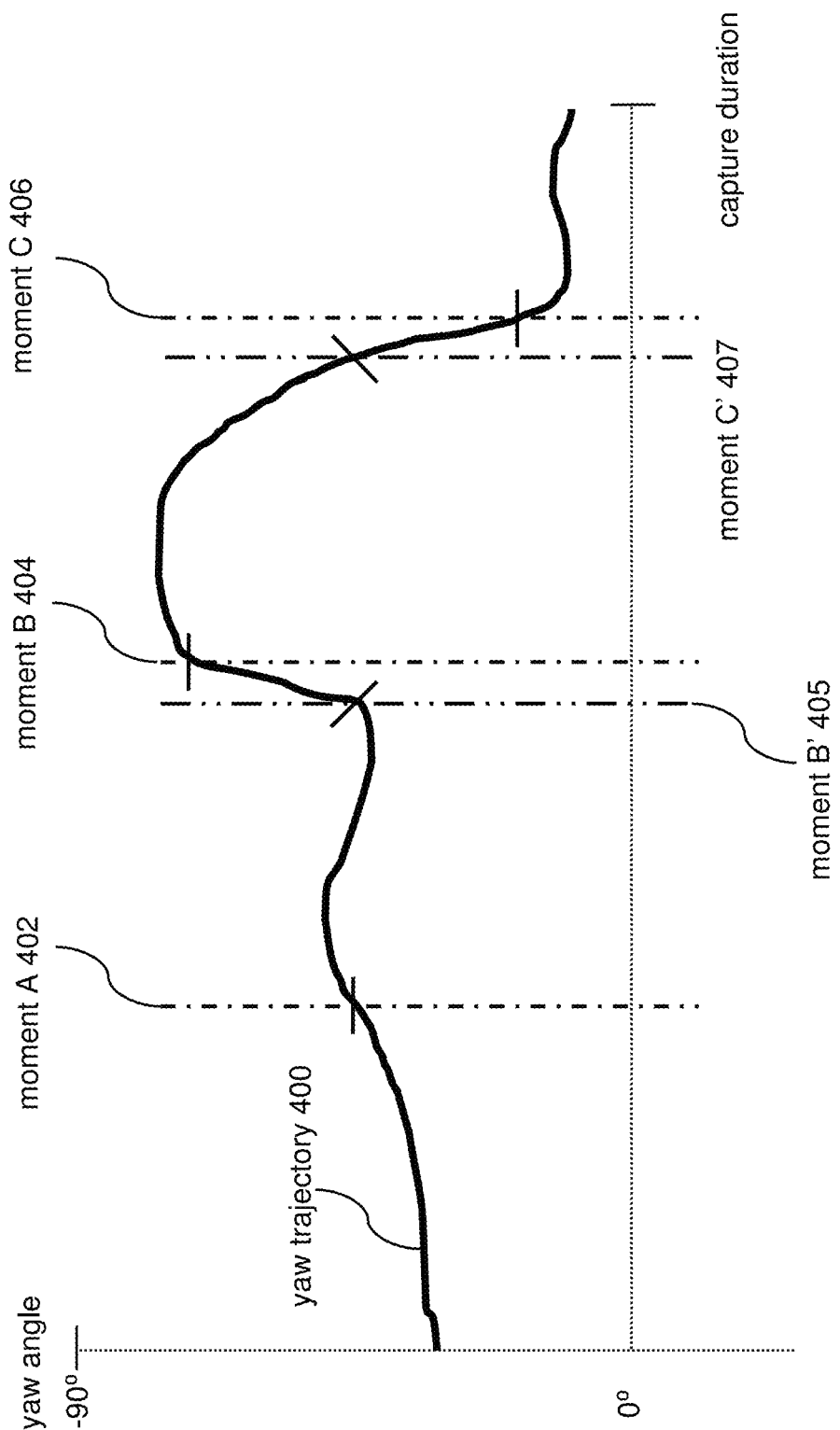
FIG. 4 illustrates an example trajectory of an image capture device and example moments within a capture duration.

FIG. 4 illustrates an example trajectory of an image capture device. The trajectory of the image capture device may include a yaw trajectory 400 of the image capture device. The yaw trajectory 400 may reflect yaw angle positions (e.g., rotational positions defined with respect to a yaw axis, rotation to the left or right) of the image capture device at different moments within the capture duration. Other types of trajectory of the image capture device (e.g., pitch trajectory, roll trajectory, translational trajectory) are contemplated.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture). The processor 310 may obtain information from the image sensor 306 and/or the motion sensor 308, and/or facilitate transfer of information from the image sensor 306 and/or the motion sensor 308 to another device/component. The processor 310 may be remote from the processor 11 or local to the processor 11. One or more portions of the processor 310 may be part of the processor 11. One or more portions of the processor 10 may be part of the processor 310.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating time-lapse videos. The machine-readable instructions 100 may include one or more computer program components. The machine-readable instructions 100 may include one or more of a video information component 102, a rotational position information component 104, a time-lapse video frames component 106, a time-lapse video content component 108, and/or other computer program components.

The video information component 102 may be configured to obtain video information defining one or more video content and/or other information. Obtaining video information may include one or more of accessing, acquiring, analyzing, determining, examining, identifying, loading, locating, opening, receiving, retrieving, reviewing, storing, and/or otherwise obtaining the video information. The video information component may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may obtain video information during acquisition of the video content and/or after acquisition of the video content by one or more image sensors/image capture devices. For example, the video information component 102 may obtain video information defining video content while the video content is being captured by image sensor(s)/image capture device(s). The video information component 102 may obtain video information defining video content after the video content has been captured and stored in memory (e.g., the electronic storage 13).

In some implementations, the video information may be obtained based on user interaction with a user interface/application (e.g., video editing application), and/or other information. For example, a user interface/application may provide one or more options for a user to select one or more video content to generate time-lapse videos. The video information defining the video content may be obtained based on the user's selection of the video content through the user interface/video application. In some implementations, the user interface/application may provide one or more options for a user to select one or more desired perceived speed-ups (e.g., 10× speed-up) for time-lapse videos.

The rotational position information component 104 may be configured to obtain rotational position information of an image capture device and/or other information. Obtaining rotational position information may include one or more of accessing, acquiring, analyzing, determining, examining, identifying, loading, locating, opening, receiving, retrieving, reviewing, storing, and/or otherwise obtaining the rotational position information. The rotational position information component 104 may obtain rotational position information from one or more locations. For example, the rotational position information component 104 may obtain rotational position information from a storage location, such as the electronic storage 13, electronic storage of information and/or signals generated by one or more sensors, electronic storage of a device accessible via a network, and/or other locations. The rotational position information component 104 may obtain rotational position information from one or more hardware components (e.g., a motion sensor) and/or one or more rotational position components (e.g., software running on a computing device).

The rotational position information component 104 may be configured to obtain rotational position information for video content during acquisition of the video content and/or after acquisition of the video content. For example, the rotational position information component 104 may obtain rotational position information for video content while the video content is being captured by image sensor(s)/image capture device(s). The rotational position information component 104 may obtain rotational position information for video content after the video content has been captured and stored in memory (e.g., the electronic storage 13). For example, the rotational position information may be captured and stored by one or more motion sensors, and may be obtained by the rotational position information component 104 when time-lapse video generation is desired.

Rotational position information of an image capture device may characterize rotational positions of the image capture device(s) that captured the video content during the capture duration. The rotational position information may characterize rotational positions of the image capture device(s) during the capture duration(s) of the video content. Rotational position information may be determined based on one or more output signals generated by one or more motion sensors (e.g., a motion sensor of the image capture device). For example, rotational position information may be conveyed by the output signals generated by the motion sensor of the image capture device. In some implementations, the motion sensor may include one or more of a gyroscope, an accelerometer, and/or an inertial measurement unit, and the rotational position information may be determined independent of the video information.

Rotational positions of an image capture device may refer to how the image capture device is oriented/rotated around one or more axis or one or more point, such as a center point. For example, rotational positions of an image capture device may refer to how the image capture device is rotated about one or more of yaw axis (e.g., such as shown by the yaw trajectory 400 in FIG. 4), pitch axis, and/or roll axis while capturing video content. Rotational position information of an image capture device may characterize how the image capture device is rotated (e.g., amount of rotations about the yaw, pitch, and/or roll axis) and/or is being rotated (e.g., speed and/or direction of rotations) at different moments within a capture duration.

The time-lapse video frames component 106 may be configured to determine time-lapse video frames from the video frames of the video content based on a spatiotemporal metric and/or other information. The spatiotemporal metric may characterize spatial smoothness, temporal regularity, and/or other characteristics of the time-lapse video frames. The spatial smoothness may refer to the regularity and/or consistency of the spatial positions (rotational positions, translational positions) of the image capture device when it captured the time-lapse video frames. The spatial smoothness may indicate how difficult it may be to create a stabilized video content based on visual content of the time-lapse video frames.

The spatial smoothness may be determined based on the rotational positions of the image capture device corresponding to the time-lapse video frames and/or other information. The rotational positions of the image capture device when it captured the time-lapse video frames may indicate to what extent different time-lapse videos contain visual information (e.g., pixels) for the same portion of a scene. For example, if the image capture device did not move in rotational direction(s) during capture of the time-lapse video frames, then the time-lapse video frames may include capture of one or more same portions of a scene. However, if the image capture moved in rotational direction(s) during capture of the time-lapse video frames, then the time-lapse video frames may not include capture of the same portion(s) of the scene and it may be difficult to create a stabilized video content based on visual content of the time-lapse video frames.

For example, a simple approach to generating a time-lapse video from a video may include selecting a smaller number of video frames from the video that exists within the video. For instance, if a perceived playback speed-up of 10× is desired for the video, then every 10th video frame of the video may be selected as time-lapse video frames for inclusion in the time-lapse video. However, such generation of time-lapse video may result in shaky and/or jerky video that cannot be stabilized. For example, if the video was captured with the image capture device being pointed at different directions (to the front, to the right, and then to the front), the time-lapse video frames that are selected simply based on number of video frames may result in a time-lapse video that includes a time-lapse video frame including visual capture of the front to be next to a time-lapse video frame including visual capture of the left. It may be more difficult and/or impossible to provide a stabilized view of such time-lapse video frames.

For example, referring to FIG. 4, determining time-lapse video frames at a moment A 402, a moment B 404, a moment C 406, and/or other moments during the capture duration of the video content may make it difficult and/or impossible to provide a stabilized view of the video content/time-lapse video frames. For example, a time-lapse video frame determined at the moment A 402 may include a capture by the image capture device which is rotated to the right by about 45 degrees. A time-lapse video frame determined at the moment B 404 may include a capture by the image capture device which is rotated to the right by about 70 degrees. A time-lapse video frame determined at the moment C 406 may include a capture by the image capture device which is rotated to the right by about 20 degrees. The different rotations of the image capture device at the moments 402, 404, 406 may result in different portions of the scene being captured within the time-lapse video frames, and make it difficult/impossible to provide a stabilized view of the captured content.

The time-lapse video frames may be selected at different moments to increase the spatial smoothness of the time-lapse video frames. A time-lapse video frame may be determined from a single video frame of the video content (e.g., selecting a video frame of the video content as a time-lapse video frame, modifying a video frame of the video content to generate a time-lapse video frame) or determined from multiple video frames of the video content (e.g., interpolating multiple video frames to generate a time-lapse video frame, modifying a video frame based on content in one or more other video frames).

For example, referring to FIG. 4, time-lapse video frames may be determined at the moment A 402, a moment B' 405, a moment C' 407, and/or other moments. Time-lapse video frames determined at the moment A 402, the moment B' 405 and the moment C' 407 may include captures by the image capture device which is rotated to the right by about 45-degrees. The same/similar rotations of the image capture device at the moments 402, 405, 407 may result in same/similar portions of the scene being captured within the time-lapse video frames, and make it easier/possible to provide a stabilized view of the captured content.

In some implementations, the time-lapse video frames may be determined by selecting a path through the trajectory of the image capture device that reduces and/or minimizes the cost of stabilizing the content within the time-lapse video frames.

In some implementations, the spatial smoothness may be determined based on the translational positions of the image capture device corresponding to the time-lapse video frames and/or other information. The translational positions of the image capture device when it captured the time-lapse video frames may indicate to what extent different time-lapse videos contain visual information (e.g., pixels) for the same portion of a scene. For example, if the image capture device did not move in translational direction(s) (e.g., forward, backwards, laterally, vertically) during capture of the time-lapse video frames, then the time-lapse video frames may include capture of the same scene (or capture of one or more portions of the same scene). However, if the image capture moved in translational direction(s) during capture of the time-lapse video frames, than the time-lapse video frames may not include capture of the same scene, and it may be difficult to create a stabilized video content based on visual content of the time-lapse video frames. Thus, translational positions of the image capture device may be used to make it easier/possible to provide a stabilized view of the captured content.

The temporal regularity may refer to regularity and/or consistency of the temporal positions of the time-lapse video frames. The temporal regularity may indicate how uniformly the time-lapse video frames are spaced about with respect to time and/or how closely the temporal positions of the time-lapse video frames match the desired perceived speed-up (e.g., 10× speed-up) for the time-lapse video.

The temporal regularity may be determined based on moments corresponding to the time-lapse video frames and/or other information. For example, referring to FIG. 4, determining time-lapse video frames at the moments 402, 404, 406 may result in a time-lapse video with video frames that are spaced about by the same time duration (e.g., for video content captured at 60 frames per second, the time-lapse video includes video frames for every ⅙ second). However, as explained above, such determination of time-lapse video frames may make it difficult/impossible to provide a stabilized view of the captured content. Determining time-lapse video frames at the moments 402, 405, 407 may result in a time-lapse video with one or more video frames that are not spaced about by the same time duration. Such difference between the moments corresponding to the time-lapse video frames and the moments corresponding to the desired perceived speed-up for the time-lapse video may be reflected in the temporal regularity of the time-lapse video frames. In some implementations, the time-lapse video frames may be determined by selecting a path through the trajectory of the image capture device that reduces and/or minimizes the cost of stabilizing the content within the time-lapse video frames while respecting one or more constraints imposed on temporal regularity of the time-lapse video frames.

In some implementations, the time-lapse video frames may be determined further based on one or more parameters of the image capture device. A parameter of the image capture device may refer to a feature or a quality of the image capture device that affects the operation of the image capture device in capturing images and/or videos. A parameter of the image capture device may be fixed or may be changed. For example, the parameter(s) of the image capture device may include a focal length of the image capture device, a principal point coordinates of the image capture device, an optical distortion model of the image capture device, and/or other parameters of the image capture device.

In some implementations, the spatiotemporal metric may include a spatial acceleration component, a temporal acceleration component, a spatial velocity component, a temporal velocity component, and/or other components. The spatial acceleration component may be determined based on angular acceleration of the image capture device during capture of the time-lapse video frames and/or other information. The spatial acceleration component may be determined based on changes in angular positions of the image capture device for three or more consecutive time-lapse video frames. The spatial acceleration component may reflect how the changes in angular positions (angular velocity) of the image capture device changes along the path through the trajectory of the image capture device for determining time-lapse video frames.

The temporal acceleration component may be determined based on differences between the moments corresponding to the time-lapse video frames and/or other information. The temporal angular acceleration component may be determined based on changes in time differences of the moments corresponding to three or more consecutive time-lapse video frames. The temporal angular acceleration component may reflect how the changes in temporal positions (temporal velocity) of the time-lapse video frames changes along the path through the trajectory of the image capture device for determining time-lapse video frames. The combination of the spatial acceleration component and the temporal acceleration component may reflect acceleration costs of the time-lapse video frames. Acceleration costs of zero may provide a smoothest path for time-lapse video frames.

The spatial velocity component may be determined based on angular velocity of the image capture device during capture of the time-lapse video frames and/or other information. The spatial velocity component may be determined based on changes in angular positions of the image capture device for two or more consecutive time-lapse video frames. The spatial velocity component may reflect how the angular positions of the image capture device change along the path through the trajectory of the image capture device for determining time-lapse video frames.

The temporal velocity component may be determined based on a comparison of a speed pattern of the time-lapse video frames and a desired speed pattern for the time-lapse video content and/or other information. A speed pattern of the time-lapse video frames may refer to a pattern created by the temporal positions of the time-lapse video frames. A desired speed pattern for the time-lapse video content may refer to a pattern of temporal positions of time-lapse video frames that would produce the desired change(s) in perceived speed of playback (e.g., speed-up, slow-down) for time-lapse video content. The temporal velocity component may be determined based on time differences of the moments corresponding to two or more consecutive time-lapse video frames. The temporal velocity component may reflect how closely the temporal positions of the time-lapse video frames matches the temporal positions of video frames that would produce the desired change(s) in perceived speed of playback for time-lapse video content. The combination of the spatial velocity component and the temporal velocity component may reflect velocity costs of the time-lapse video frames. Velocity costs of zero may provide a static path for time-lapse video frames.

Figure 5:
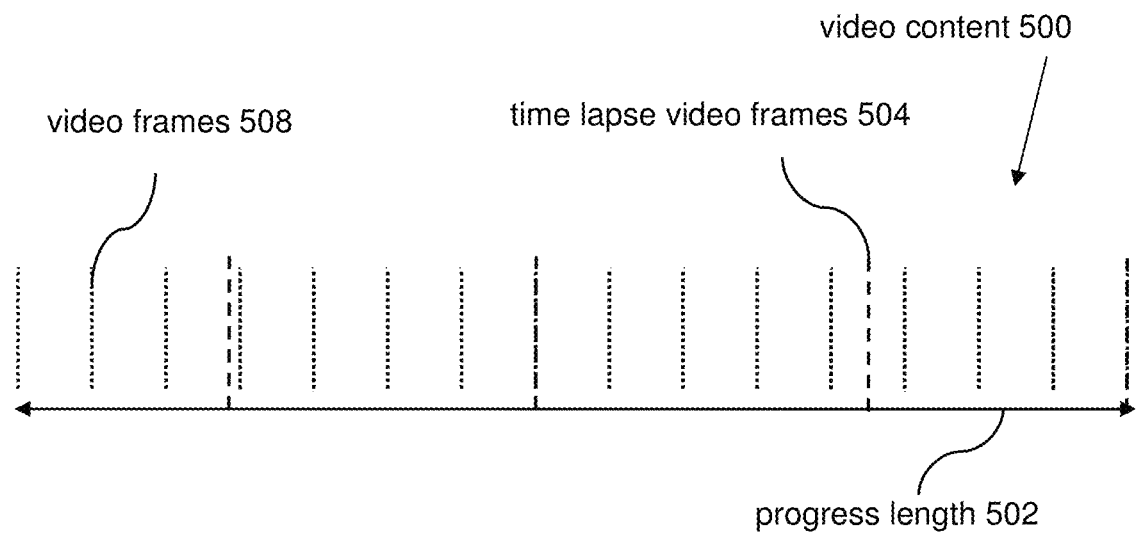
FIG. 5 illustrates example video frames and time-lapse video frames.

For example, referring to FIG. 5, a user may wish to create a time-lapse video content from a video content 500 with the desired change in perceived speed of playback of 4× (speed-up of 4×). The video content may include video frames 508 and have a progress length 502. The desired speed pattern for the time-lapse video content may include a pattern of temporal positions at every fourth video frame. Time-lapse video frames 504 may be determined for the time-lapse video content. The first and third of the time-lapse video frames 504 may not be located precisely at the temporal positions of the fourth and twelfth video frame of the video content 500, and the mismatch between the speed pattern of the time-lapse video frames 504 and the desired speed pattern for the time-lapse video content may be reflected in the temporal velocity component.

In some implementations, velocity costs and/or acceleration costs may be computed for video frames of the video content which are candidates for time-lapse video frames. In an initial pass, for individual video frames, the smallest cost of any paths that leads to the particular video frame may be computed. In a final pass, the video frame with the least total cost may be identified and used to construct the path through the trajectory of the image capture device for determining time-lapse video frames.

In some implementations, the spatiotemporal metric may further include a content component. The content component may be determined based on the visual content of the time-lapse video frames and/or other information, and the spatiotemporal metric may further characterize content characteristics of the time-lapse video frames. Content characteristics may refer to desirability and/or undesirability of visual content of the time-lapse video frames for inclusion in time-lapse video content. The content component may reflect the desirability of including particular content within different video frames within time-lapse video content. That is, the content component may reflect to what extent one or more content captured within individual video frames are desirable to be included within time-lapse video frames. For example, the content component may indicate to what extent time-lapse video frames include capture of one or more highlight events (e.g., event(s) relevant to one or more users), such as capture of a particular subject (e.g., object, person, scenery), a particular emotion, a particular activity (a particular activity captured within video frames and/or a particular activity being performed with the image capture device during capture of video frames), and/or other particular content. The content component may indicate qualities of the time-lapse video frames, such as whether the time-lapse video frames are exposed correctly, include little or no blur (determined based on rotational position information), include proper framing of subjects, face detection, and/or other qualities of the time-lapse video frames.

In some implementations, video frames of the video content may be scored based on its content, such as based on a number of positives qualities and/or number of negative qualities of the time-lapse video frames. For example, a score of a video frame may be increased/decreased to reflect the desirability of the video frame being included as a time-lapse video frame based on the number of positive qualities regarding the content of the video frame. A score of a video frame may be decreased/increased to reflect the undesirability of the video frame being included as a time-lapse video frame based on the number of negative qualities regarding the content of the video frame.

In some implementations, the content characteristics of the video frames may be used to determine content cost (frame-based cost). The content cost may be used to determine the path through the trajectory of the image capture device for determining time-lapse video frames. The content cost may be used with other costs, such as acceleration costs and velocity costs. For example, content cost may include a frame jump cost, which places a cost (e.g., high cost) on large jumps over video frames including highlight events. Such cost may discourage skipping over many video frames that include highlight events. Such cost may discourage not including video frames with highlight events as time-lapse video frames and/or not using such video frames to determine time-lapse video frames. The frame jump cost may place a cost (e.g., high cost) on small jumps over video frames not including highlight events. Such cost may encourage skipping over many video frames that do not include highlight events. Such cost may encourage video frames with no highlight events to not be included as time-lapse video frames and/or to not use such video frames to determine time-lapse video frames.

In some implementations, the speed pattern of the time-lapse video frames may be determined based on the content characteristics of the time-lapse video frames and/or other information. That is, the visual content of the time-lapse video frames may determine the perceived speed with which the time-lapse video frames are presented during playback of the time-lapse video content. For example, the speed pattern of the time-lapse video frames may include a speed-up for a sub-set of the time-lapse video frames based on the content characteristics of the sub-set of the time-lapse video frames indicating no highlight event within the sub-set of the time-lapse video frames.

Figure 6:
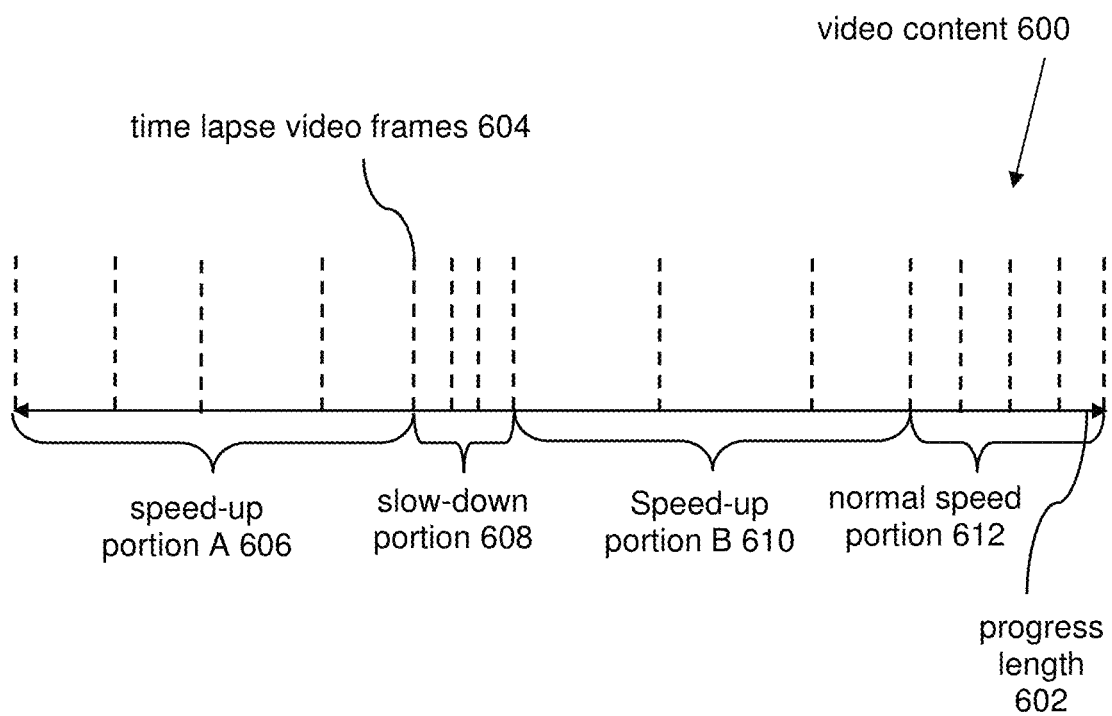
FIG. 6 illustrates example time-lapse video frames and changes in perceived playback speed of video content.

For example, FIG. 6 illustrates example time-lapse video frames 604 and example changes in perceived playback speed of video content 600. The video content 600 may have a progress length 602. The time-lapse video frames 604 may be determined so that the speed pattern of the time-lapse video frames 604 includes a speed-up portion A 606, a slow-down portion B 608, a speed-up portion B 610, and a normal speed portion 612. For example, based on the content characteristics of the video frames within the speed-up portion A 606 and the speed-up portion B 610 indicating that these video frames do not include capture of interest (e.g., no highlight event, poor quality), sets of the time-lapse video frames 604 may be determined so that the playback of the time-lapse video content "speeds through" these portions. Based on the content characteristics of the video frames within the slow-down portion 608 and the normal speed portion 612 indicating that these video frames do include capture of interest (e.g., highlight event, good quality), sets of the time-lapse video frames 604 may be determined so that the playback of the time-lapse video content "slows down" through slow-down portion 608 and plays at "regular speed" through the normal speed portion 612. Other changes in the speed pattern of the time-lapse video frames are contemplated.

In some implementations, determining the time-lapse video frames may include: selecting one or more sets of video frames of the video content based on the spatiotemporal metric and/or other information, and stabilizing at least some of the set(s) of video frames. A set of video frames may include multiple video frames. Stabilizing video frames may include using smaller visual content portions of the video frames to provide a punch-out view of the video frames that create a more stable view than when generating video content by using the entire visual content of the video frames. A punch-out of a video frame may refer to one or more portions of the video frame that is used for presentation, such as a cut-out of the video frame or a cropped portion of the video frame. A punch-out of a video frame may include one or more visual portions of the video frame used as time-lapse video frames and/or one or more visual portion portions of the video frame used to generate time-lapse video frames.

In some implementations, the punch-outs of the video frames may be determined based on generation of a (smooth) path through the trajectory of the image capture device that minimizes of a rotational velocity of the image capture device and a rotational acceleration of the image capture device. For instance, a smooth path defining yaw angle position, pitch angle position, and/or roll angle position may be generated by finding a path of the image capture device that minimizes a combination of a time derivative, a second time derivative, and/or other time derivative(s) of the yaw angle position, pitch angle position, and/or roll angle position. Other determinations of the path through the trajectory of the image capture device are contemplated.

Figure 7:
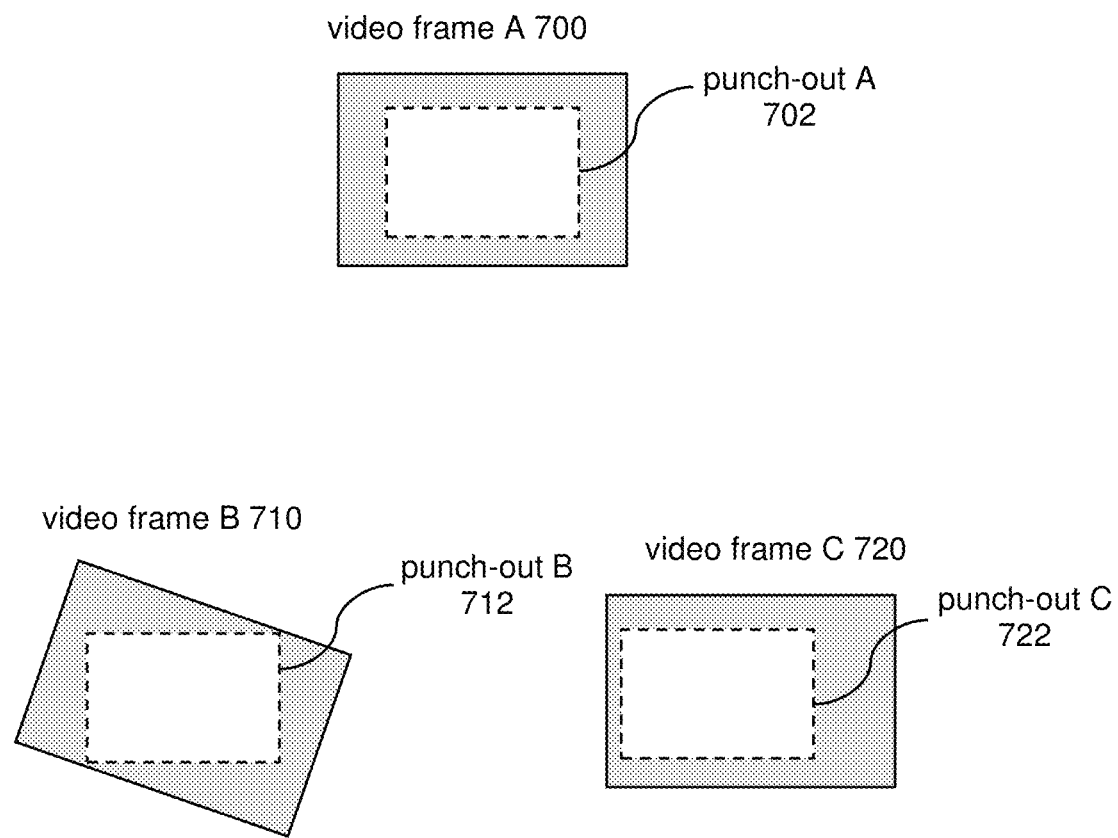
FIG. 7 illustrates example punch-outs for video frames.

The positions along the path may determine the position and/or rotation of the punch-outs with respect to the video frames. For example, FIG. 7 illustrates example punch-outs for video frames of video content. Based on a particular position along the path, a punch-out A 702 may be placed leveled within the center of a video frame A 700. The punch-out A 702 may be oriented with respect to the video frame A 700 to provide a view of the video frame A 700 that is stable with respect to a prior and/or next punch out of video frames (e.g., stable with a punch-out 712 of a video frame B 710). Based on a particular position along the path, the punch-out B 712 may be placed rotated within the center of the video frame B 710. The punch-out B 712 may be oriented with respect to the video frame B 710 to provide a view of the video frame B 710 that is stable with respect to a prior and/or next punch out of video frames (e.g., stable with the punch-out A 702 of the video frame A 700 and/or a punch-out C 722 of a video frame C 720). Based on a particular position along the path, the punch-out C 722 may be placed leveled to the left of the center of the video frame C 720. The punch-out C 722 may be oriented with respect to the video frame C 720 to provide a view of the video frame C 720 that is stable with respect to a prior and/or next punch out of video frames (e.g., stable with the punch-out 712 of the video frame B 710). Other orientations of the punch-outs with respect to video frames are contemplated.

In some implementations, the time-lapse video frames may be determined based on warping of video frames or one or more portions of the video frames (e.g., portions of the video frames within punch-outs, portions of the video frames outside punch-outs). The warping of the video frames may provide for different perspectives of content captured within the video frames, with the different perspectives corresponding to how the content would have looked had the video frames been captured from a different location.

In some implementations, the spatial smoothness of the time-lapse video frames may be determined based on one or more transformations applied to the time-lapse video frames. A transformation may refer to change in and/or an operation to change one or more visual aspects of the time-lapse video frames, such as the use of punch-outs and/or warping to determine time-lapse video frames. Application of a transformation to a time-lapse video frame may include changing the time-lapse video frame, changing another video frame to determine the time-lapse video frame, and/or other changes to the time-lapse video frame. For example, one or more transformations may be applied to a time-lapse video frame to make the time-lapse video frame appear as if it were captured from different (e.g., smoother) orientations.

In some implementations, the time-lapse video frames may be determined further based on one or more skipping bounds and/or other information. A skipping bound may refer to a bound based on which one or more video frames of the video content may be skipped from being considered for/as time-lapse video frame(s) and/or may not be captured. For example, the time-lapse video frames may be determined based on a lower skipping bound and an upper skipping bound. A lower skipping bound may define/be based on a minimum number of video frames that should be skipped after a time-lapse video frame has been determined. An upper skipping bound may define/be based on a maximum number of video frames that should be skipped after a time-lapse video frame has been determined. The lower skipping bound and the upper skipping bound may be used to determine the number of frames that may be skipped between two successive time-lapse video frames. Such skipping of video frames may provide for more efficient time-lapse video content generation, such as by reducing processing power, memory, and/or time required to determine time-lapse video frames. Values of one or more skipping bounds may be determined based on user input, system defaults, system parameters, and/or other information.

For example, to generate a 10× time-lapse video content, time-lapse video frames may include every tenth video frame of the video content. That is, nine video frames of the video content may be skipped when determining (e.g., selecting) two successive time-lapse video frames. Variations in the "speed-up" of the time-lapse video content may be accepted to improve smoothness of the time-lapse video content. However, such variations in the "speed-up" of the time-lapse video frames may be controlled/limited by the lower skipping bound and the upper skipping bound.

For instance, to generate a 10× time-lapse video content, the lower-skipping bound may be set to be 8 and the upper-skipping bound may be set to be 10. In this instance, once a video frame of the video content has been selected as a time-lapse video frame, the following eight video frames may be skipped (ignored) from being considered for/as a time-lapse video frame, and one among the next three video frames may be selected as/used to determine a time-lapse video frame. The following six video frames may also be skipped. For example, if video frame N is selected as a time-lapse video, then, based on the lower-skipping bound of 8 and the upper skipping bound of 10, video frames N+1 to N+8, N+12 to N+17, N+23 to N+26 and N+34 to N+35 may be ignored. Other values of skipping bounds are contemplated.

In some embodiments, capture of the video content may be changed based on one or more skipping bounds and/or other information. For example, referring to the above example of the lower-skipping bound set to 8 and the upper-skipping bound set to 10, time-lapse video frames may be determined during capture of video content. If the video frame N is selected as a time-lapse video frame, then there would be no need to capture video frames N+1 to N+8, N+12 to N+17, N+23 to N+26 and N+34 to N+35 since they would be ignored for time-lapse video frame determination. In this case, the image capture device capturing the video content may be configured (e.g., instructed) to avoid capturing one or more of the video frames that will be ignored (e.g., one or more of the video frames N+1 to N+8, N+12 to N+17, N+23 to N+26 and N+34 to N+35 that have not yet been captured) to preserve power consumption and battery life.

Referring back to FIG. 1, the time-lapse video content component 108 may be configured to generate time-lapse video content based on the time-lapse video frames and/or other information. The time-lapse video content component 108 may generate time-lapse video content based on visual content of the time-lapse video frames. For example, the time-lapse video frames may be used as and/or used to generate the video frames of the time-lapse video content. The time-lapse video content may include a fewer number of video frames than the video content. The fewer number of video frames within the time-lapse video content may make the playback of the time-lapse video content to be presented with a perceived playback speed that is faster than a perceived playback speed of the video content. For example, referring to FIG. 5, the video content may include the video frames 508, and the time-lapse video content may include the time-lapse video frames 504.

The time-lapse video content generated by the time-lapse video content component 108 may be defined by time-lapse video information. Time-lapse video information defining time-lapse video content may define an encoded version/ copy of the time-lapse video content and/or instructions for rendering the time-lapse video content. For example, the time-lapse video information may define an encoded version/copy of the time-lapse video content, and the time-lapse video information (e.g., video file) may be opened in a video player for presentation of the time-lapse video content. The time-lapse video information may define instructions to render the time-lapse video content for presentation. For example, the time-lapse video information may define a director track that includes information as to which video frames and/or which visual portions of the video frames of the video content should be included within the presentation of the time-lapse video content. The director track may include information on the location and/or shape of the punch-out of video frames to be used to as a function progress through the video content to provide a stabilized and time-lapse view of the video content. A video player may use the director track to retrieve the relevant visual portions of the video content/video frames when the time-lapse video content is opened/to be presented.

The time-lapse video content component 108 may be configured to effectuate storage of the time-lapse video information and/or other information in one or more storage media. For example, the time-lapse video information may be stored in the electronic storage 13, remote storage locations (storage media located at/accessible through a server), and/or other locations. In some implementations, the time-lapse video content component 108 may effectuate storage of the time-lapse video information through one or more intermediary devices. For example, the processor 11 may be located within a computing device without a connection to the storage device (e.g., the computing device lacks Wi-Fi/ cellular connection to the storage device). The time-lapse video content component 108 may effectuate storage of the time-lapse video information through another device that has the necessary connection (e.g., the computing device using a Wi-Fi/cellular connection of a paired mobile device, such as a smartphone, tablet, laptop, to store information in one or more storage media). Other storage locations for and storage of the time-lapse video information are contemplated.

Figure 8:
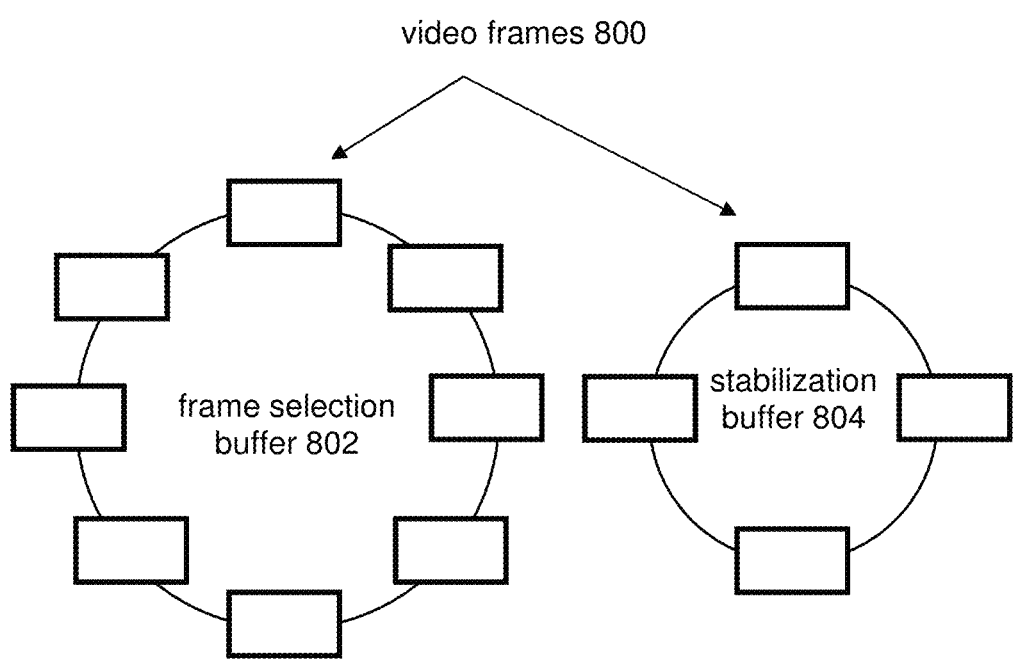
FIG. 8 illustrates example frame selection buffer and stabilization buffer.

In some implementations, the time-lapse video content may be generated based on storage of one or more sets of video frames in a frame selection buffer and a stabilization buffer. A frame selection buffer may refer to memory for storing video frames that are selected for use in determining time-lapse video frames. A stabilization buffer may refer to memory for storing video frames to be used in stabilizing time-lapse video frames. For example, FIG. 8 illustrates an example frame selection buffer 802 and an example stabilization buffer 804. The frames selection buffer 802 and/or the stabilization buffer 804 may include a circular buffer. The frame selection buffer 802 and/or the stabilization buffer 804 may store one or more of the video frames 800. For example, FIG. 8 illustrates 8 video frames stored in the frame selection buffer 802 and 4 video frames stored in the stabilization buffer 804. The frames selection buffer 802 and/or the stabilization buffer 804 may be capable of storing the same number of video frames or different number of video frames (e.g., 25 video frames in the frame selection buffer 802, 15 video frames in the stabilization buffer 804).

In some implementations, the video frames stored in the frame selection buffer 802 and/or the stabilization buffer 804 may correspond to different intervals of time. For example, the video frames stored in the frame selection buffer 802 may be spaced apart in time (of capture, of progress length) by $1/30$ second while the video frames stored in the stabilization buffer 804 may be spaced apart in time by $1/6$ second. Other time intervals are contemplated.

The frame selection buffer 802 may store a sequence of video frames that includes a candidate to continue a sequence of video frames stored in the stabilization buffer 804. When a new video frame is stored in the stabilization buffer 804, the earliest video frame in the stabilization buffer 804 may be lost. Stabilization of video frames may be performed by accessing video frames in both the frame selection buffer 802 and the stabilization buffer 804, which may allow for a longer temporal horizon.

Video frames may be selected for storage in the frame selection buffer 802 and/or the stabilization buffer 804 based on an initialization pass, a forward pass, a backward pass, and/or other passes. In the initialization pass, initial costs of including video frames in the path through the trajectory of the image capture device may be determined, and a cost table may be initialized by costs of sub-paths including two points. In the forward pass, lowest cost for subpaths ending by two given points may be determined, and an index table may be updated. In the backward pass, optical path encoded within the index table may be restored.

When a new video frame is captured and/or otherwise obtained, information relating to video frames stored in the frame selection buffer 802 and/or the stabilization buffer 804 may be used to determine whether to change which video frames are stored in the frame selection buffer 802 and/or the stabilization buffer 804. If the frame selection buffer 802 is not full, the newly arrived video frame may be stored in the frame selection buffer 802. If the frame selection buffer 802 is full, then it may be determined whether to (1) insert the newly arrived video frame into the frame selection buffer 802, and (2) whether to store the earliest video frame in the frame selection buffer 802, which will be pushed out of the frame selection buffer 802 by insertion of the newly arrived video frame, in the stabilization buffer 804. When the stabilization buffer 804 is full, the stabilization may be run to stabilization the video frames. In some implementations, the stabilization may be performed using an LP-based stabilization (minimizing a linear combination of L1-norms of angular velocity and angular acceleration within a given stabilization window), a projected gradient descent stabilization (iteratively minimizing a sum of squared L2-norms of velocity and acceleration through a gradient descent), a bounded gradient descent stabilization (computing orthogonal projection on polytope), and/or other stabilization techniques. If the stabilization buffer 804 includes stabilized video frames, the earliest of the stabilized video frame may be pushed to output.

In some implementations, early discard and/or preselection may be used to cover a larger temporal horizon without increasing the buffer size. With early discard, a speedup cost function may provide that the cost of frame stepping smaller than a certain amount (e.g., threshold amount) leads to high/infinite cost. For example, to generate time-lapse video content with desired perceived speed-up of 10×, the speedup cost function may be determined so that n+1th video frame and n+2th video frame cannot be selected if nth video frame has been selected for time-lapse video frame. Thus, once a video frame is selected (fixed), the following few frames (corresponding to the threshold number of adjacent video frames) may be discarded. With preselection, one or more criteria may allow for dropping of a newly arrived frame rather than pushing it into the frame selection buffer 802 and allow the frame selection buffer 802 to include frames that cover a larger temporal horizon.

In some implementations, the video content may include spherical video content and/or other video content. Spherical video content may refer to a video capture of multiple views from a location. Spherical video content may include a full spherical video capture (360-degrees of capture, including opposite poles) or a partial spherical video capture (less than 360-degrees of capture). Spherical video content may be captured through the use of one or more image capture devices (e.g., cameras, image sensors, optical elements) to capture images/videos from a location. Spherical video content may be generated based on light received within a field of view of a single image sensor or within fields of view of multiple image sensors during a capture duration. For example, multiple images/videos captured by multiple cameras/image sensors may be combined/stitched together to form the spherical video content. The field(s) of view of camera(s)/image sensor(s) may be moved/rotated (e.g., via movement/rotation of optical element(s), such as lens, of the image sensor(s)) to capture multiple images/videos from a location, which may be combined/stitched together to form the spherical video content.

Spherical video content may include spherical video frames that define visual content viewable from a point of view as a function of progress through the progress length of the spherical video content. That is, visual content of the spherical video content may be included within spherical video frames of the spherical video content.

A spherical video frame may include a spherical image of the spherical video content at a moment within the progress length of the spherical video content. For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) and/or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with a resolution close to 1080p. In some implementations, spherical video content may include 12-bit video frames.

In some implementations, video content (e.g., spherical video content) may be consumed as virtual reality content. Virtual reality content may refer to content (e.g., spherical video content) that may be consumed via virtual reality experience. Virtual reality content may associate different directions within the virtual reality content with different viewing directions, and a user may view a particular direction within the virtual reality content by looking in a particular direction. For example, a user may use a virtual reality headset to change the user's direction of view. The user's direction of view may correspond to a particular direction of view within the virtual reality content. For example, a forward-looking (e.g., north) direction of view for a user may correspond to a forward (e.g., north) direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audiobooks, and/or other audio content), multimedia presentations, images, slideshows, visual content (e.g., one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
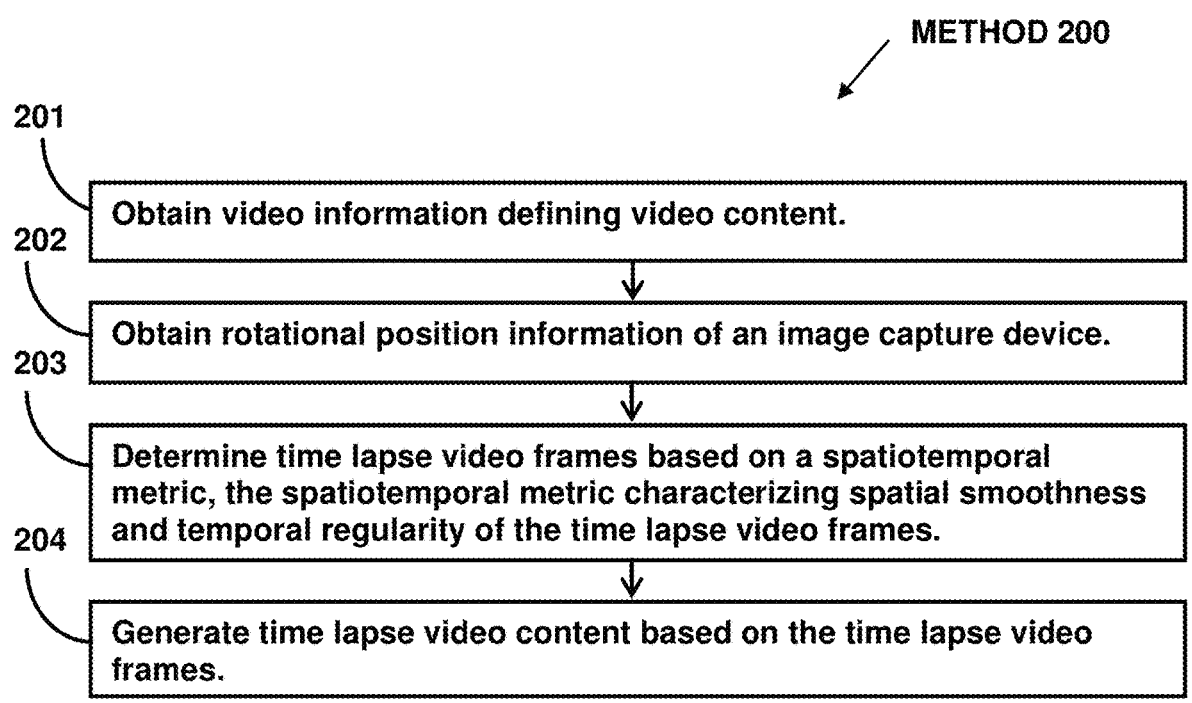
FIG. 2 illustrates a method for generating time-lapse videos.

FIG. 2 illustrates method 200 for generating time-lapse videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining video content may be obtained. The video content may be captured by an image capture device during a capture duration. The video content may have a progress length. The video content may include video frames that define visual content viewable as a function of progress through the progress length. The video frames may correspond to moments within the progress length. In some implementations, operation 201 may be performed by a processor component the same as or similar to the video information component 102 (Shown in FIG. 1 and described herein).

At operation 202, rotational position information of an image capture device may be obtained. The rotational position information may characterize rotational positions of the image capture device during the capture duration based on output signals generated by a motion sensor. In some implementations, operation 202 may be performed by a processor component the same as or similar to the rotational position information component 104 (Shown in FIG. 1 and described herein).

At operation 203, time-lapse video frames may be determined based on a spatiotemporal metric. The spatiotemporal metric may characterize spatial smoothness and temporal regularity of the time-lapse video frames. The spatial smoothness may be determined based on the rotational positions of the image capture device corresponding to the time-lapse video frames, and the temporal regularity may be determined based on moments corresponding to the time-lapse video frames. In some implementations, operation 203 may be performed by a processor component the same as or similar to the time-lapse video frames component 106 (Shown in FIG. 1 and described herein).

At operation 204, time-lapse video content may be generated based on the time-lapse video frames. The time-lapse video content may include a fewer number of video frames than the video content. In some implementations, operation 204 may be performed by a processor component the same as or similar to the time-lapse video content component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for generating time-lapse videos, the image capture device comprising:
   a housing;
   an image sensor carried by the housing and configured to generate an image output signal conveying image information based on light that becomes incident thereon, the image information defining video frames;
   an optical element carried by the housing and configured to guide light within a field of view to the image sensor; and
   one or more physical processors configured by machine-readable instructions to:
      determine time-lapse video frames from the video frames for generation of time-lapse video content, wherein the time-lapse video frames are determined based on regularity and/or consistency in spatial positions of the housing during capture of the video frames and based on regularity and/or consistency in time at which the video frames are captured, wherein determination of the time-lapse video frames from the video frames is limited by a lower skipping bound and an upper skipping bound, the lower skipping bound defining a minimum number of video frames for skipping and the upper skipping bound defining a maximum number of video frames for skipping in the determination of the time-lapse video frames from the video frames, the lower skipping bound and the upper skipping bound establishing a range of the video frames from which next time-lapse video frame is determined, wherein the determination of the time-lapse video frames from the video frames being limited by the lower skipping bound and the upper skipping bound includes the video frames outside the range of video frames not being captured by the image capture device; and
      generate the time-lapse video content based on the time-lapse video frames.

2. The image capture device of claim 1, wherein the time-lapse video frames are determined based on regularity and/or consistency in spatial positions of the housing during capture of the video frames to increase spatial smoothness of the time-lapse video frames.

3. The image capture device of claim 2, wherein the spatial smoothness is determined further based on one or more transformations applied to the time-lapse video frames.

4. The image capture device of claim 1, wherein temporal regularity of the time-lapse video frames is determined based on the moments corresponding to the time-lapse video frames, and the time-lapse video frames are determined to respect one or more constraints on the temporal regularity of the time-lapse video frames.

5. The image capture device of claim 4, wherein the temporal regularity of the time-lapse video frames includes an extent of uniformity in temporal spacing of the moments corresponding to the time-lapse video frames.

6. The image capture device of claim 4, wherein the temporal regularity of the time-lapse video frames includes an extent of match between perceived speed-up provided by the time-lapse video frames and desired speed-up for the time lapse video content.

7. The image capture device of claim 1, wherein the one or more physical processors are, to determine the time-lapse video frames, further configured to:
   select a set of video frames; and
   stabilize at least some of the set of video frames.

8. The image capture device of claim 1, wherein the time-lapse video content is generated based on storage of one or more sets of video frames in a frame selection buffer and a stabilization buffer.

9. The image capture device of claim 8, wherein the frame selection buffer includes first memory to store video frames for use in determining the time-lapse video frames and the stabilization buffer includes second memory to store video frames for use in stabilizing the time-lapse video frames.

10. A method for generating time-lapse videos, the method performed by an image capture device, the image capture device including one or more processors, an image sensor, and an optical element, the image sensor configured to generate an image output signal conveying image information based on light that becomes incident thereon, the image information defining video frames, the optical element configured to guide light within a field of view to the image sensor, the method comprising:
   determining time-lapse video frames from the video frames for generation of time-lapse video content, wherein the time-lapse video frames are determined based on regularity and/or consistency in spatial positions of the image capture device during capture of the video frames and based on regularity and/or consistency in time at which the video frames are captured, wherein determination of the time-lapse video frames from the video frames is limited by a lower skipping bound and an upper skipping bound, the lower skipping bound defining a minimum number of video frames for skipping and the upper skipping bound defining a maximum number of video frames for skipping in the determination of the time-lapse video frames from the video frames, the lower skipping bound and the upper skipping bound establishing a range of the video frames from which next time-lapse video frame is determined, wherein the determination of the time-lapse video frames from the video frames being limited by the lower skipping bound and the upper skipping bound includes the video frames outside the range of video frames not being captured by the image capture device; and
   generating the time-lapse video content based on the time-lapse video frames.

11. The method of claim 10, wherein the time-lapse video frames are determined based on regularity and/or consistency in spatial positions of the image capture device during capture of the video frames to increase spatial smoothness of the time-lapse video frames.

12. The method of claim 11, wherein the spatial smoothness is determined further based on one or more transformations applied to the time-lapse video frames.

13. The method of claim 10, wherein temporal regularity of the time-lapse video frames is determined based on the moments corresponding to the time-lapse video frames, and the time-lapse video frames are determined to respect one or more constraints on the temporal regularity of the time-lapse video frames.

14. The method of claim 13, wherein the temporal regularity of the time-lapse video frames includes an extent of uniformity in temporal spacing of the moments corresponding to the time-lapse video frames.

15. The method of claim 13, wherein the temporal regularity of the time-lapse video frames includes an extent of match between perceived speed-up provided by the time-lapse video frames and desired speed-up for the time lapse video content.

16. The method of claim 10, wherein determining the time-lapse video frames includes:
    selecting a set of video frames; and
    stabilizing at least some of the set of video frames.

17. The method of claim 10, wherein the time-lapse video content is generated based on storage of one or more sets of video frames in a frame selection buffer and a stabilization buffer.

18. The method of claim 17, wherein the frame selection buffer includes first memory to store video frames for use in determining the time-lapse video frames and the stabilization buffer includes second memory to store video frames for use in stabilizing the time-lapse video frames.

19. An image capture device for generating time-lapse videos, the image capture device comprising:
    a housing;
    an image sensor carried by the housing and configured to generate an image output signal conveying image information based on light that becomes incident thereon, the image information defining video frames;
    an optical element carried by the housing and configured to guide light within a field of view to the image sensor; and
    one or more physical processors configured by machine-readable instructions to:
        determine time-lapse video frames from the video frames for generation of time-lapse video content, wherein the time-lapse video frames are determined based on regularity and/or consistency in spatial positions of the housing during capture of the video frames and based on regularity and/or consistency in time at which the video frames are captured, further wherein the time-lapse video frames are determined based on regularity and/or consistency in spatial positions of the housing during capture of the video frames to increase spatial smoothness of the time-lapse video frames, temporal regularity of the time-lapse video frames is determined based on the moments corresponding to the time-lapse video frames, and the time-lapse video frames are determined to respect one or more constraints on the temporal regularity of the time-lapse video frames, wherein determination of the time-lapse video frames from the video frames is limited by a lower skipping bound and an upper skipping bound, the lower skipping bound defining a minimum number of video frames for skipping and the upper skipping bound defining a maximum number of video frames for skipping in the determination of the time-lapse video frames from the video frames, the lower skipping bound and the upper skipping bound establishing a range of the video frames from which next time-lapse video frame is determined, wherein the determination of the time-lapse video frames from the video frames being limited by the lower skipping bound and the upper skipping bound includes the video frames outside the range of video frames not being captured by the image capture device; and
        generate the time-lapse video content based on the time-lapse video frames.

20. The image capture device of claim 19, wherein the time-lapse video content is generated based on storage of one or more sets of video frames in a frame selection buffer and a stabilization buffer.

* * * * *